US005595208A

United States Patent [19]

Augustinus et al.

[11] Patent Number: 5,595,208

[45] Date of Patent: Jan. 21, 1997

[54] DOUBLE VALVE

[76] Inventors: Per K. Augustinus, Troense Strandvej 57, 5700 Svendborg; Ken Riis, Ostergards Allé 45, 5250 Odense SV, both of Denmark

[21] Appl. No.: 421,531

[22] Filed: Apr. 13, 1995

Related U.S. Application Data

[63] Continuation of PCT/DK95/00085 Feb, 24, 1995

[51] Int. Cl.[6] .......... F16K 17/14

[52] U.S. Cl. .......... 137/68.11; 137/212; 222/400.7

[58] Field of Search .......... 137/68.11, 212; 222/397, 400.7

[56] References Cited

U.S. PATENT DOCUMENTS

| | | |
|---|---|---|
| 4,142,658 | 3/1979 | Golding . |
| 4,509,663 | 4/1985 | Fallon . |
| 4,612,952 | 9/1986 | Fallon . |

FOREIGN PATENT DOCUMENTS

| | | |
|---|---|---|
| 2712968 | 10/1977 | Germany . |
| 4303461 | 4/1994 | Germany . |
| 2185469 | 8/1987 | United Kingdom . |

*Primary Examiner*—Gerald A. Michalsky
*Attorney, Agent, or Firm*—Brooks & Kushman P.C.

[57] ABSTRACT

A double valve 1 is used for a container 4 of the type serving the purpose of distribution of a liquid, e.g., beer, which is stored in the container 4 under pressure of a gas, e.g., $CO_2$. The valve 1 comprises a liquid passage 5, a gas passage 6, an elastomeric valve ring 7 placed in the gas passage and axially displaceable for closing the gas passage 6, and an opening 10 formed in the valve ring 7 which forms the mouth of the liquid passage 5. A valve plug 11 is placed in the liquid passage 5 and is axially displaceable, serving the purpose of closing the mouth. In the valve ring 7, a reinforcement ring 19 is inserted with an inside turning collar 21 having a number of incisions 23. At these incisions 23 there will be created weaker areas in the valve ring 7 which will be broken in such a way that there will be a free passage created for the flow of the gas out to the open when the pressure in the container 4 by intensive heating of the gas during, for instance a fire, exceeds the acceptable limit for the container 4. In that case, the double valve will work as an efficiently operating security valve.

18 Claims, 4 Drawing Sheets

DOUBLE VALVE

RELATED APPLICATIONS

This application is a continuation of International Application PCT/DK95/00085 having an international filing date of Feb. 24, 1995, now abandoned, which claims priority from Danish application No. 234/94 filed Feb. 24, 1994.

TECHNICAL FIELD

This invention relates to valves for containers storing pressurized liquids such as beer or carbonated soft drinks.

BACKGROUND ART

Containers with valves are used for beer, cola and similar popular beverages. The numbers being in circulation are very high and the containers will often be situated in restaurants or similar establishments where many people will come and go.

The containers are normally without any danger to the surroundings. The working pressure is only a few bars, and the containers are dimensioned on the large side to be able to resist this pressure. If a container, however, is exposed to intense heat, which for instance might be the case when a building is burning, the pressure in the container might be so high, that the container will explode.

When these containers are used for foodstuffs they can hardly be supplied with special security valves to blow off at too high a pressure. This is a among other things, due to the fact that an efficiently operating security valve is a rather complicated mechanism with components and inaccessible corners which are liable to resist the cleaning which the containers otherwise are subjected to. Therefore, there will always be a risk that such security valves might be a hotbed of developing, for example, cultures of bacteria which might destroy or poison the beverages being stored in the container.

The double valves, which are mounted on the containers, have a construction which entails that the valves, without being dismounted, can be cleaned efficiently and safely in the same process as the container. The construction entails, however, at the same time, that the higher the pressure in the container rises, the tighter the valve will close. These conventional double valves are therefore not able to secure a container from exploding due to overpressure.

There is thus a need for a double valve which has all the advantages of the conventional double valves and is just as easy to clean, and furthermore is constructed to secure the container from being blow up due to too an overpressure.

SUMMARY OF THE INVENTION

This invention relates to a double valve for a container of the type being used for distributing a liquid, e.g., beer, stored in the container under pressure of a gas, e.g., $CO_2$, whereby the valve defines an axis and comprises a central liquid passage; an elastomeric valve ring placed in the gas passage and axially movable serving the purpose of closing the passage, under influence of the gas pressure and the spring force from a pressure spring, by being pressed into tight engagement with a seat in the valve; an opening formed in the valve ring and forming the mouth of the liquid passage; and a valve plug being axially movable and placed in the liquid passage serving the purpose of closing said mouth by, under influence of load from the valve plug and the spring force from a pressure spring, being pressed into tight engagement with a seat formed in the opening of the valve ring.

The novel and unique features according to the invention, whereby the above-identified need is achieved, is the fact, that the valve ring has at least one area which is so much weaker than the adjoining areas, that the weaker area is deformed so much when the valve is in a closed condition under influence of the load of the valve plug and the gas pressure, that the seat of the valve ring relieves the tight engagement with the valve plug in or at the weaker area, when the pressure in the container exceeds a predetermined pressure, larger than the normal working pressure in the container.

On the outside, the valve looks like a conventional double valve and it can be cleaned just as easily to an optimum extent. In daily use, the valve is also working in precisely the same way, but if the pressure in the container now exceeds the normal operating pressure, the hidden qualities of the valve will, at a certain time, come into operation. This moment occurs when the pressure in the valve has risen to said predetermined higher pressure than the working pressure. The valve is then leaking at the valve ring, whereby the gas starts to flow out through the leakage. The pressure in the container can no longer rise. In this condition, the valve has automatically transformed itself into an efficiently working security valve.

In practice, the construction of the valve ring is therefore adapted in such a way that it will leak at a pressure level which, on one hand, is higher than the normally existing working pressures, and on the other hand is at a safe distance from the explosion limit. A container which is mounted with such a double valve will then be secured from explosion, for instance, should it be exposed to intense heat, and without any influence on the function of the container when under normal operating conditions.

In order to impart the elastomeric valve ring with sufficient stability, so that the valve can be closed safely in daily use, it can be supplied with an inserted reinforcement ring which, e.g., can be of metal or plastic. The weaker areas, which will cause the valve ring to leak at an overpressure too high, can then be provided by forming on the reinforcement ring an inward turning collar and let the outline of the opening, which is limited by the collar, deviate from a full circle. The areas in the valve ring, where the radial distance of the collar from the valve axis is larger, will then become weaker in relation to the areas where the radial distance of the collar from the valve axis is smaller.

When along the outline in the opening of the collar there are diametrically opposite areas with smaller distance than the outer diameter of the valve plug, the plug cannot pass the opening. This construction prevents the valve plug from being shot out into the room as a danger to the surroundings, if the elastomeric material of the valve ring should give in for an overpressure. The plug is stopped by the reinforcement ring which is made of a stiff and strong material as, e.g., metal or plastic.

By a particularly advantageous embodiment, the outline of the collar opening has mainly the form of a circle interrupted by a number of incisions being formed in the collar with equidistant distances along the periphery. The weaker areas are formed at the incision and can optimally be adjusted to the purpose in dependence of the width and depth of the incisions. Since there are many incisions, there will at the same time be formed a great blow-off area for the gas when the elastomeric material gives in for an overpressure, whereby a high rate of security is created to the effect that the pressure will not rise further.

When the diameter of the circle outline, which is limited by the collar material between the incisions, is smaller than the inner diameter of the plug, the plug will then at overpressure, where the elastomeric material of the valve ring gives in, be stopped at areas which are regularly distributed along the opening of the collar of the reinforcement ring. Thereby, the collar will provide an efficient security against the plug being shot out into the room. The plug is controlled retained in position in the valve by the many areas with smaller diameters than the outward diameter of the plug, and can consequently not get out edgeways at the areas with larger diameters.

The weaker areas in the elastomeric material of the valve ring can conveniently be weakened by dimensioning the incisions with an adequately big width and depth. If the joined area of the incisions, however, is too big, it can have a negative effect on the stability of the valve ring under normal working conditions and reduce the ability of the collar to stop and retain the plug from being shot out by overpressure.

To avoid these drawbacks, at least the edges turning toward the plug in the incisions of the collar can have such a sharpness that the edges cut into the elastomeric material by overpressure, but not by normal working pressure. By overpressure, the elastomeric material at the incisions will then be cut into pieces, and the size of the width and depth of these can consequently be reduced adequately.

The function of the double valve as a security valve depends on how the weaker areas of the valve ring are being arranged. By forming a reinforcement ring, the function can be adapted to the purpose by an adequate forming of the outline in the opening of the collar.

The character of the load acting on the valve ring by overpressure, is furthermore of significant importance to the security function of the valve ring. This load is due to the gas pressure, which partly influences directly on the valve ring, and partly indirectly via the valve plug. When the seat of the valve ring forms a surface of revolution which converges toward the mouth of the valve ring, the force, whereby the plug acts on the valve ring, is increased. The plug is squeezing itself into the opening of the valve ring and thereby presses the elastomeric material in this latter up and outward with great force, so that the material probably will be forced out through the incisions of the collar and opens for outflow of gas, thereby relieving the overpressure.

The elastomeric material can have a very high elasticity so that the material is not broken at the weaker areas but just gives in to the load and returns to its original shape when the overpressure is relieved.

In order to obtain optimum effectiveness of the security device of the double valve and also be able to see whether the valves have been in function or not, whereby the container and the valve might have been exposed to damage, it will, however, be an advantage if the material is completely or partly broken at the weaker areas of the valve ring. In this case, the elastomeric material in itself should be rather stiff and have a small elongation.

The valve plug can in this connection mainly be formed as a spherical segment which is connected with an underlying abutting ring for the pressure spring with narrow legs in a construction which entails that most of the edge of the spherical segment is free.

By making said edge sharp, the spherical segment then will act as a sort of punch being able, by overpressure, to stamp out some of the elastomeric material of the valve ring if this material is rather stiff and has a small elongation.

When first the material is first completely or partly stamped out it is easily shot out through the incision of the inside turning collar of the reinforcement ring as the plug during the stamping process is wandering into the valve ring for being stopped, at last, when abutting the reinforcement ring.

FIGS. *6a–6c* show three successive steps in which the double valve by overpressure is turned into a security valve.

BEST MODE FOR CARRYING OUT THE INVENTION

Figure 1:
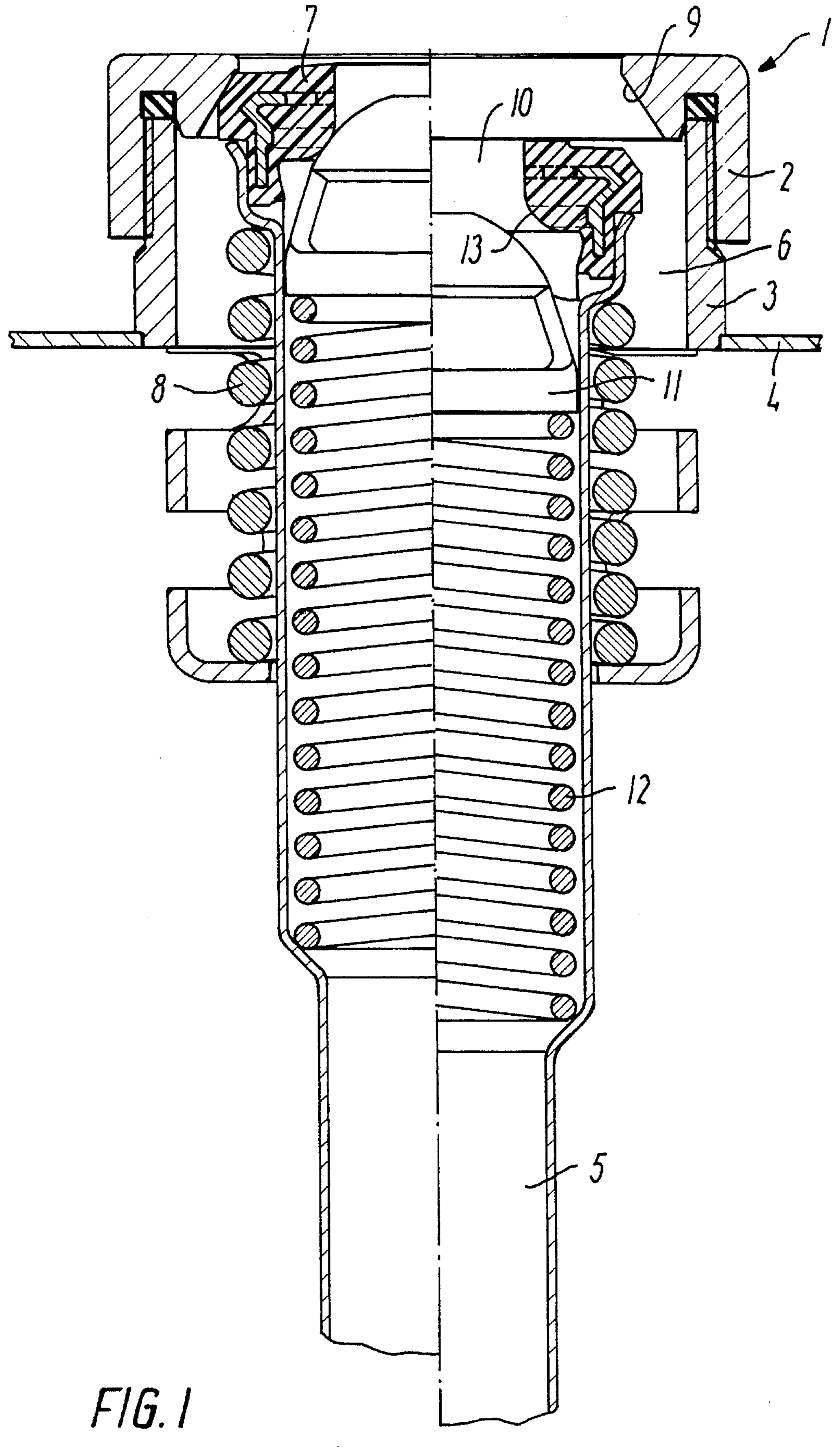
FIG. 1 shows an axial section through a double valve according to the invention.

FIG. 1 shows a double valve which is generally designated by the reference numeral 1. This double valve is more or less a well-known type and therefore only roughly described here. The double valve 1 is by a thread assembly 2 screwed into a neck ring 3 on a container 4 which can only be seen in fragment.

The container might typically be a transportable container for a beverage as, e.g., beer or cola, which is to be kept under pressure by a gas, e.g., $CO_2$. The pressure will, under normal working conditions, only be of a few bars.

In the valve there is a central liquid passage 5 and around this a ring-formed gas passage 6. Both passages can be closed by an axially displaceable elastomeric valve ring 7, which closes the gas passage 6 by means of the gas pressure and a first pressure spring 8 being pressed tight up against a seat 9 in the valve at the mouth of the gas passage. The valve ring 7 itself forms with its opening 10 the mouth of the liquid passage 5 which again can be closed off by an axially displaceable valve plug 11, which by the gas pressure and a second pressure spring 12 is pressed tight up against a seat 13 in the mouth of the valve ring.

When the container is to be used, the valve is mounted by a special coupling head (not shown) which can open both the gas passage and the liquid passage. The inside of the container is then connected to a pressure gas source keeping the pressure in the container on the working pressure requested. The gas is, among other things, working gas a driving as which by opening of a drain cock (not shown) connected to the liquid passage, is driving the liquid out to the consumption place.

When closing the coupling head, the pressure is normally kept in the container, even if it is emptied of liquid. Also the full containers, coming from the producer, will have a content of pressure gas, and thus there will always be in circulation a very large amount of containers with gas holding a pressure of a few bars higher than the atmospheric pressure. The containers are, however, dimensioned on the large side to be able to resist the load from this pressure.

If a container, however, is exposed to intensive heat, e.g., a burning building, the gas pressure might then rise so heavily that the container can no longer resist. The container will then blow up with an explosive force.

This risk has been completely eliminated by means of the particular embodiment of the valve ring 7 and the valve plug 11.

Figure 2:
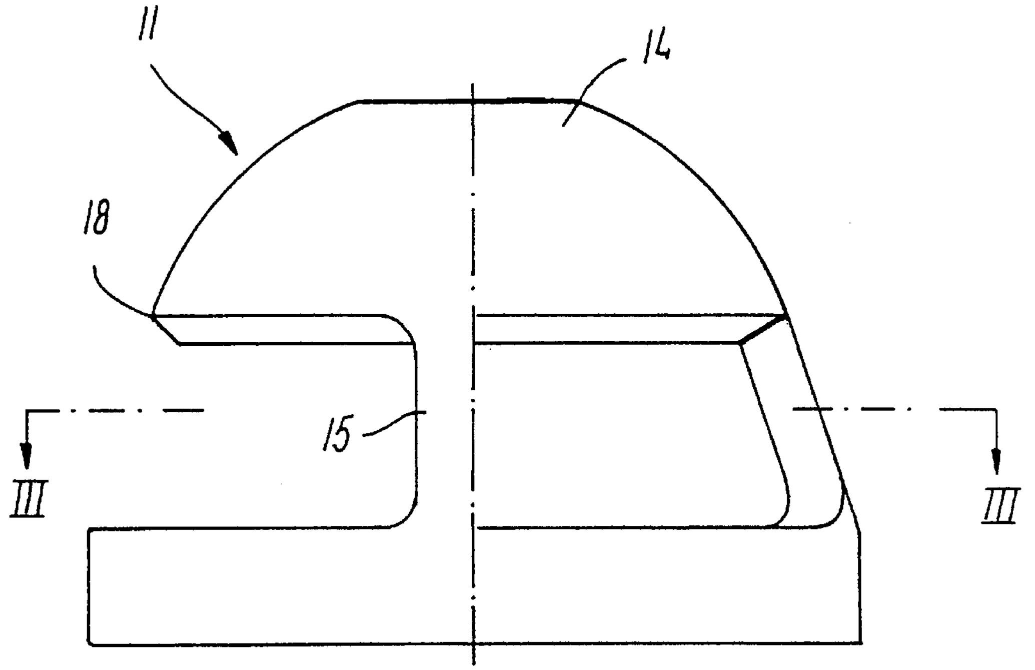
FIG. 2 is a side view, in a larger scale, of a valve plug for the double valve shown in FIG. 1.
Figure 3:
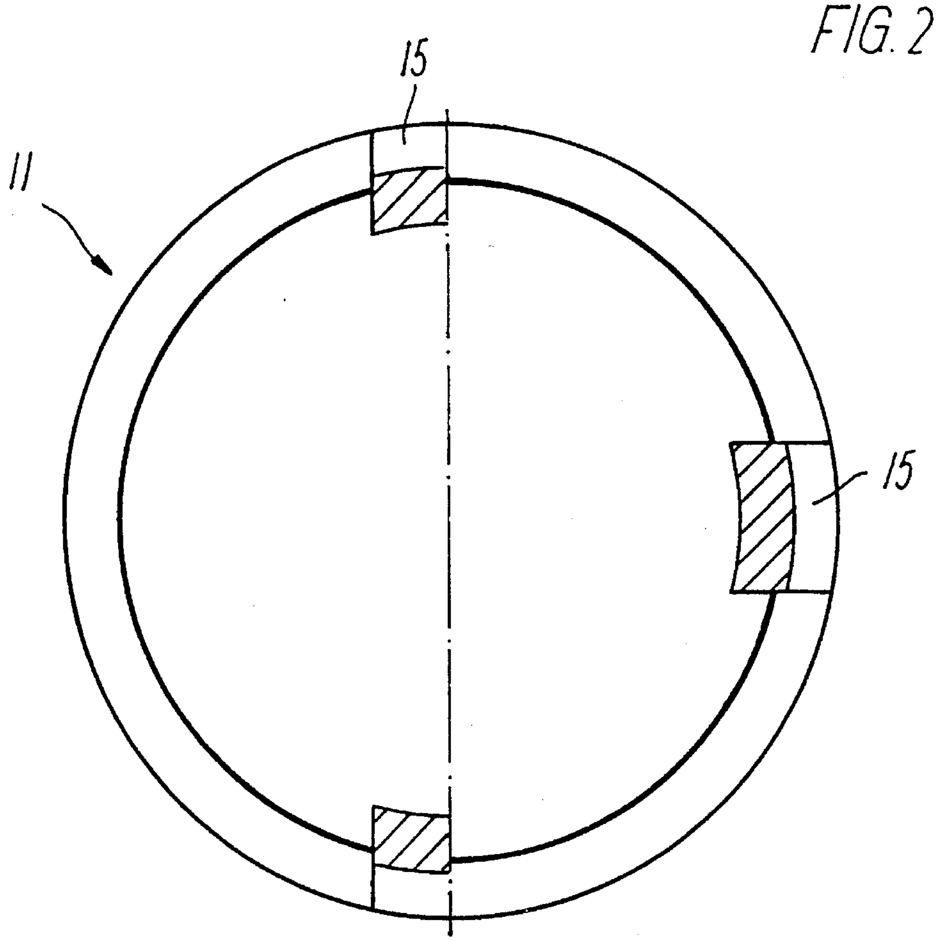
FIG. 3 is the same, taken along the line 3—3.

FIGS. 2 and 3 show the valve plug 11 with the left and the right side of the figures turning 90 degrees in relation to each other. The plug is built up by a spherical segment 14 which with two narrow, but adequately strong legs 15, are connected to an abutting ring 16, which serves as support to the second pressure spring 12 (FIG. 1). The ring is shown in the embodiment closed, but can also be partially open.

Between the spherical segment 14 and the abutting ring 16 there are on both sides of the legs 15 passage openings 17 for passage of the liquid. At these openings the spherical segment 14 has a sharp edge 18 which extends across the main part of the periphery of the spherical segment as the width of the legs only makes a very small part of the length of the latter.

Figure 4:
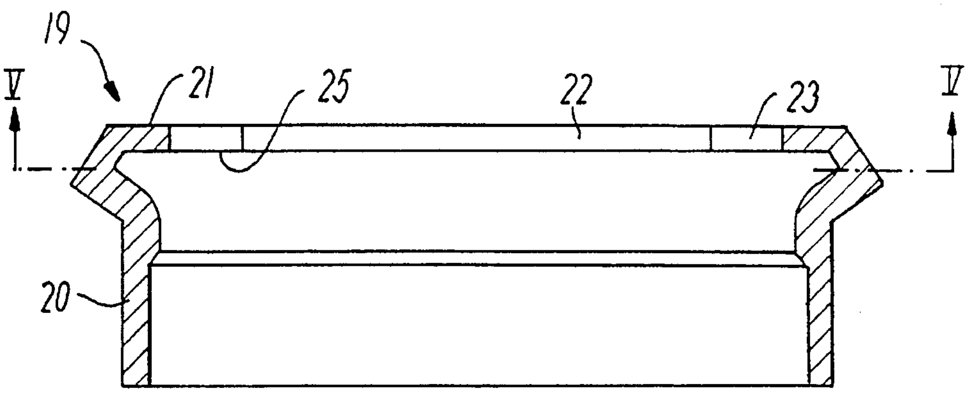
FIG. 4 is a view in a larger scale of a reinforcement ring for a valve ring for the double valve shown in FIG. 1.
Figure 5:
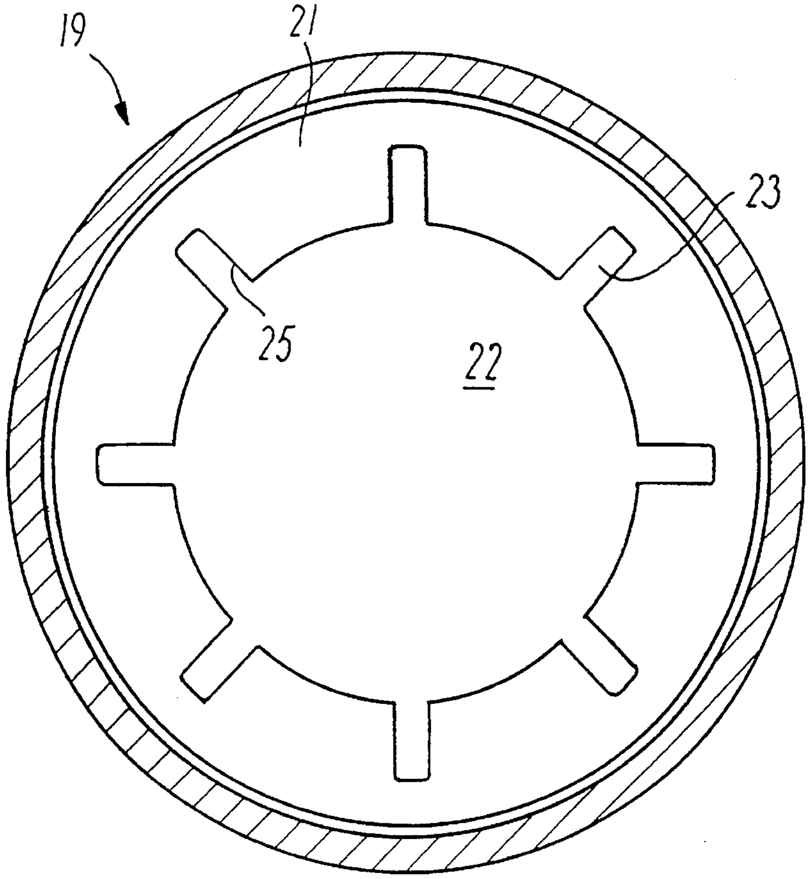
FIG. 5 is the same, taken along the line 5—5 in FIG. 4.
Figure 6A:
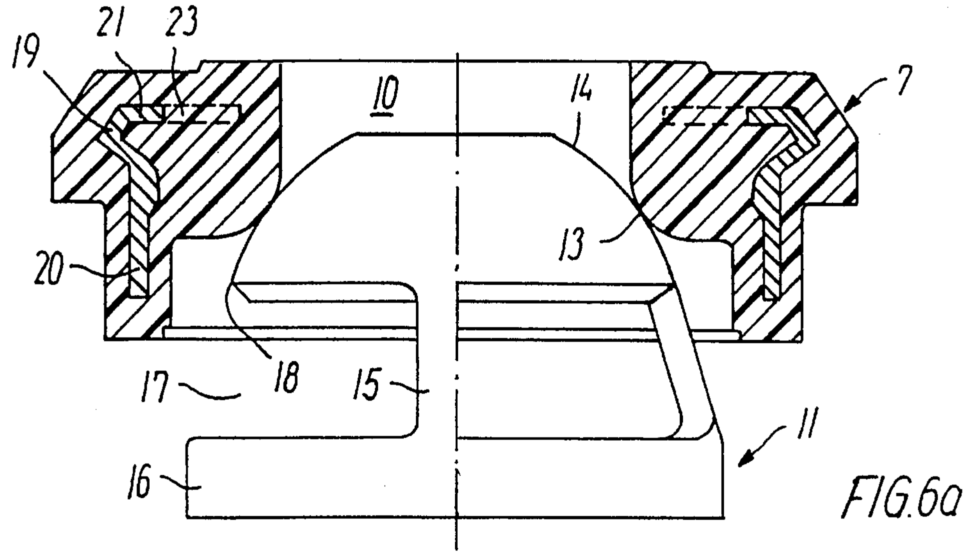
Figure 6B:
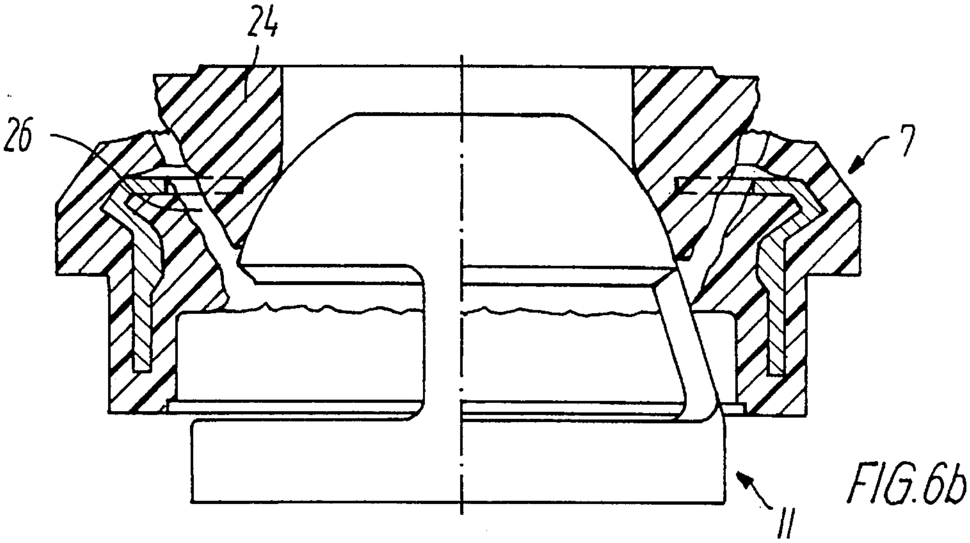
Figure 6C:
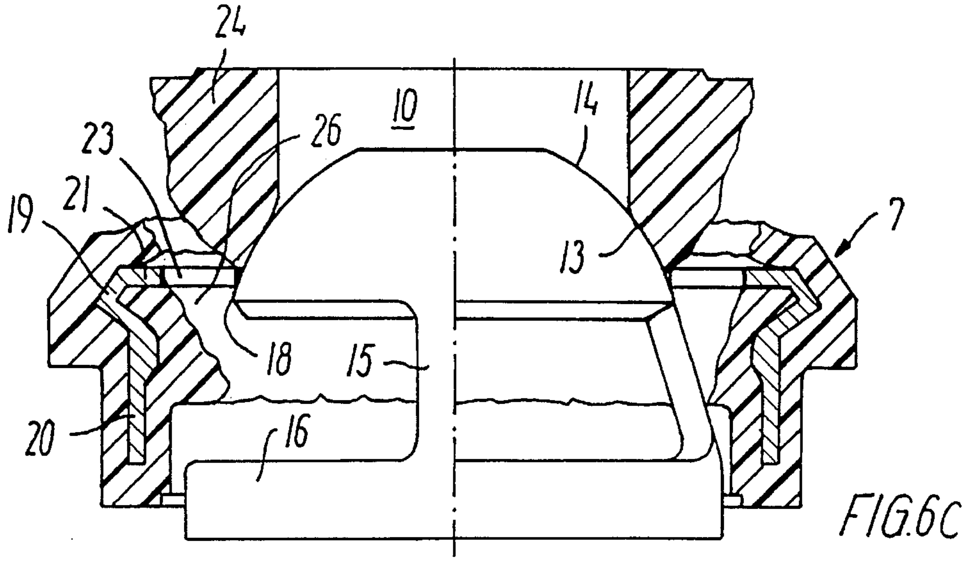

FIGS. 4 and 5 show a reinforcement ring 19 for inserting into the elastomeric valve ring 7 for stiffening and stabilization of this latter. The reinforcement ring 19 has a mandrel 20 which follows the shape of the valve ring. At the top, the mandrel emerges into an inside turning collar 21 which limits a circular opening 22 with eight uniformly distributed incisions 23 of a mainly rectangular shape. The reinforcement ring 19 is, by the way, in the shape of a sheet with a comparatively thin wall thickness and it is made from a strong and stiff material as, e.g., steel.

The diameter of the opening is a little smaller than the outer diameter of the segment 14, and the distance from the center of the circle to the bottom of an incision is larger than half the outer diameter of the spherical segment. Furthermore, each incision has a width of between 1.0% and 4.0%, preferably between 1.5% and 3.5% and especially between 2.0% and 3.0% of the circle length of the opening.

FIGS. *6a–6c* now show how the security device is operating when the pressure in the container exceeds a certain limit, normally called the overpressure permitted.

In FIG. *6a*, the valve plug 11 with its spherical segment 14 is resting on the valve ring 7's seat 13. The position can be the normal closed position, but can also be the start position at a pressure exceeding the acceptable pressure where the security operation of the valve is coming into function.

In FIG. *6b*, this has taken place. The spherical segment has with great power squeezed itself into the opening 10 of the valve ring compressing the surrounding elastomeric material in the valve ring into an upwards direction and simultaneously also outward due to the pointed shape of the spherical segment outer diameter as well as of the seat of the valve ring.

In the example shown, it is presumed that the elastomeric material is rather stiff and has a relatively small elongation. As it can be seen, the spherical segment will then be acting as a punch tool stamping with its sharp edge 18 the material 24 out of the remaining part of the valve ring. The material, which is totally or partly released, will at the same time be shot up through the inward turning reinforcement collar 21's incisions 23 which advantageously can have sharp edges 25 cutting like knives the released material into strips which are easily being able to pass the incisions.

Between the still fixed material of the valve ring and the released material there will in this way be formed grooves 26 allowing the gas to flow out to the open environment through the incisions 23, the material strips in these being blown out by the outflowing gas. Thereby, the pressure in the container is being relieved.

Between the incisions there may also emerge leaks and especially if the circular part of the collar opening has sharp downward turning edges cutting the already released material below free from the collar.

FIG. *6c* shows the final position of the security device when the valve plug 11 has been stopped by the collar 21 of the reinforcement ring 19 since the circular opening 22 of this latter has a smaller diameter than the outer diameter of the spherical segment 14. The valve plug can consequently not be shot out of the valve as a projectile which might hit persons nearby.

As it can be seen, the double valve according to the invention will, under normal conditions, work as a conventional double valve. From outside it also appears as such and it can just as easily be cleaned up to the high hygienic standard which is required for containers for beverages.

The safety qualities are hidden and are only evident when the valve at pressures exceeding the acceptable is transformed into an efficiently working security valve releasing at an acceptable overpressure which is far below the limit where the container can explode.

What is claimed is:

1. A double valve for a container of the type used for distribution of a liquid stored in the container under pressure of a gas, whereby the valve defines an axis and comprises a central liquid passage; a ring formed gas passage placed around the liquid passage; an elastomeric non-liquified valve ring placed in the gas passage and axially movable serving the purpose of closing the gas passage by, under influence of the gas pressure and the spring force from a pressure spring, being pressed into tight engagement with a seat in the valve; an opening formed in the valve ring forming the mouth of the liquid passage; and a valve plug being axially displaceable and placed in the liquid passage serving the purpose of closing the mouth by under influence of the load of the valve plug and the spring force from a pressure spring being pressed into tight engagement with a seat formed in the opening of the valve ring, characterized in that the valve ring has at least one area, which is so much weaker than the surrounding areas, that the weaker area is deformed so much in the closed condition of the valve under influence of the load of the valve plug and the gas pressure that the mouth of the liquid passage is no longer closed, when the pressure in the container exceeds a predetermined pressure larger than the normal working pressure in the container.

2. A double valve according to claim 1 wherein the valve plug is formed as a spherical segment which by narrow legs is connected to an underlying abutting ring for the pressure spring.

3. A double valve according to claim 2 wherein the spherical segment includes a free edge which is sharp.

4. A double valve according to claim 1 wherein a reinforcement ring is inserted into the valve ring, the reinforcement ring being made of one of a metal and a plastic material.

5. A double valve according to claim 4 wherein an inward turning collar of the reinforcement ring is limiting an opening with an outline forming a circle, which at least at one location emerges into an outline formed as an incision in the collar.

6. A double valve according to claim 5 wherein the circle has a diameter which is smaller than the diameter of the spherical segment.

7. A double valve according to claim 5 wherein at least one incision has a width of between 1.0% and 4.0% of the circle length of the opening.

8. The double valve according to claim 7 wherein the width is between 1.5% and 3.5% of the circle length of the opening.

9. The double valve according to claim 7 wherein the width is between 2.0% and 3.0 of the circle length of the opening.

10. A double valve according to claim 5 wherein the distance from the center of the circle to the bottom of the incision is larger than the diameter of the spherical segment.

11. A double valve according to claim 10 wherein the seat of the valve ring is formed by a surface of revolution converging toward the mouth of the valve ring.

12. A double valve according to claim 11 wherein the elastomeric material of the valve ring is stiff with a comparatively small elongation.

13. The double valve according to claim 4 wherein the reinforcement ring has an inside turning collar limiting an opening, the collar having an outline which deviates from a full circle.

14. A double valve according to claim 13 wherein at least at one location along the outline of the collar opening there is a location where the distance between diametrically opposite areas are smaller than the diameter of the spherical segment of the valve plug.

15. A double valve according to claim 13 wherein the collar has sharp edges on the side turning toward the valve plug.

16. A double valve for a container of the type used for distribution of a liquid stored in the container under pressure of a gas whereby the valve defines an axis and comprises a central liquid passage; a ring formed gas passage placed around the liquid passage; an elastomeric valve ring placed in the gas passage and axially movable serving the purpose of closing the gas passage by, under influence of the gas pressure and the spring force from a pressure spring, being pressed into tight engagement with a seat in the valve; an opening formed in the valve ring forming the mouth of the liquid passage; and a valve plug being axially displaceable and placed in the liquid passage serving the purpose of closing the mouth by under influence of the load of the valve plug and the spring force from a pressure spring being pressed into tight engagement with a seat formed in the opening of the valve ring, characterized in that the valve ring has at least one area, which is so much weaker than the surrounding areas, that the weaker area is deformed so much in the closed condition of the valve under influence of the load of the valve plug and the gas pressure that the mouth of the liquid passage is no longer sealed when the pressure in the container exceeds a predetermined pressure larger than the normal working pressure in the container.

17. The double valve according to claim 16 wherein the valve ring is non-liquified and tears in response to the overpressure condition to release gas pressure while retaining the valve ring in the double valve.

18. The double valve according to claim 16 wherein the valve ring is non-liquified and sufficiently deflects in response to the overpressure condition to release gas pressure while retaining the valve ring in the double valve.

* * * * *

UNITED STATES PATENT AND TRADEMARK OFFICE

CERTIFICATE OF CORRECTION

PATENT NO. : 5,595,208
DATED : January 21, 1997
INVENTOR(S) : Per K. Augustinus, Ken Riis It is certified that error appears in the above-identified patent and that said Letters Patent is hereby corrected as shown below:

In Column 1, line 30, after "is" insert --,--, and delete "a" (second occurrence).

In Column 1, line 50, delete "blow" and replace with --blown-- therefor, and after "too" insert --high--.

In Column 4, line 1, delete "first" (first occurrence).

In Column 4, lines 52, delete "gas" and replace with --as-- therefor.

In Column 4, line 53, delete "as" and replace with --gas-- therefor.

In Column 7, line 4, after "3.0" insert --%--.

Signed and Sealed this

Twenty-third Day of December, 1997

Attest:

Bruce Lehman

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. :5,595,208
DATED :January 21, 1997
INVENTOR(S) :Augustinus, et al

It is certified that error appears in the above-identified patent and that said Letters Patent is hereby corrected as shown below:

On the title page, insert item [73] -- Assignee: Micro Matic A/S --.

Signed and Sealed this

Twenty-fourth Day of February, 1998

Attest:

BRUCE LEHMAN

*Attesting Officer* *Commissioner of Patents and Trademarks*